United States Patent [19]

Wintner

[11] 4,239,717
[45] Dec. 16, 1980

[54] COMPRESSION MOLDING PROCEDURE FOR LIQUID POLYESTER RESINS

[76] Inventor: Paul Wintner, 1420 Freeport Loop, Brooklyn, N.Y. 11239

[21] Appl. No.: 35,257

[22] Filed: May 2, 1979

[51] Int. Cl.³ .............................................. B29G 1/00
[52] U.S. Cl. .................................. 264/108; 264/236; 264/316; 264/347; 264/DIG. 34; 264/DIG. 65
[58] Field of Search ............... 264/101, 102, 313, 316, 264/DIG. 34, 236, 108, DIG. 65, 347

[56] References Cited

U.S. PATENT DOCUMENTS

| | | | |
|---|---|---|---|
| 2,067,580 | 1/1937 | Röhm | 264/313 |
| 2,962,764 | 12/1960 | Trojanowski et al. | 264/297 |
| 2,962,767 | 12/1960 | Trojanowski et al. | 264/313 |
| 3,216,060 | 11/1965 | Trojanowski et al. | 425/89 |
| 3,287,481 | 11/1966 | Trojanowski et al. | 264/108 |
| 3,331,904 | 7/1967 | Friedman | 264/108 |
| 3,459,843 | 8/1969 | Fischler | 264/108 |
| 3,551,541 | 12/1970 | Rossetti | 264/102 |

Primary Examiner—Jeffery R. Thurlow

Attorney, Agent, or Firm—Ostrolenk, Faber, Gerb & Soffen

[57] ABSTRACT

A molding process for compression molding blanks from a polymerizable, thermosetting resinous composition in which pearlescent particulate materials are mixed: Upper and lower mold parts, at least one of which has mold cavities formed in it, are held in an open condition. The resinous composition is sandwiched between two sheets of a film material and is placed on the lower mold part. At least one of the layers of film material is stretchable. The mold parts are moved together until the upper mold part contacts, without applying pressure to, the top of the resinous composition. The mold parts are held at this semi-closed condition for a period of time at an elevated temperature, thereby causing the viscosity of the resinous composition to rise significantly. The mold parts are then moved to the fully closed condition at which molding pressure is applied to the resinous material, and the resinous composition is then forced into and shaped by the mold cavities in the mold parts. The resinous composition eventually polymerizes and the molded blanks are removed from the mold.

14 Claims, 5 Drawing Figures

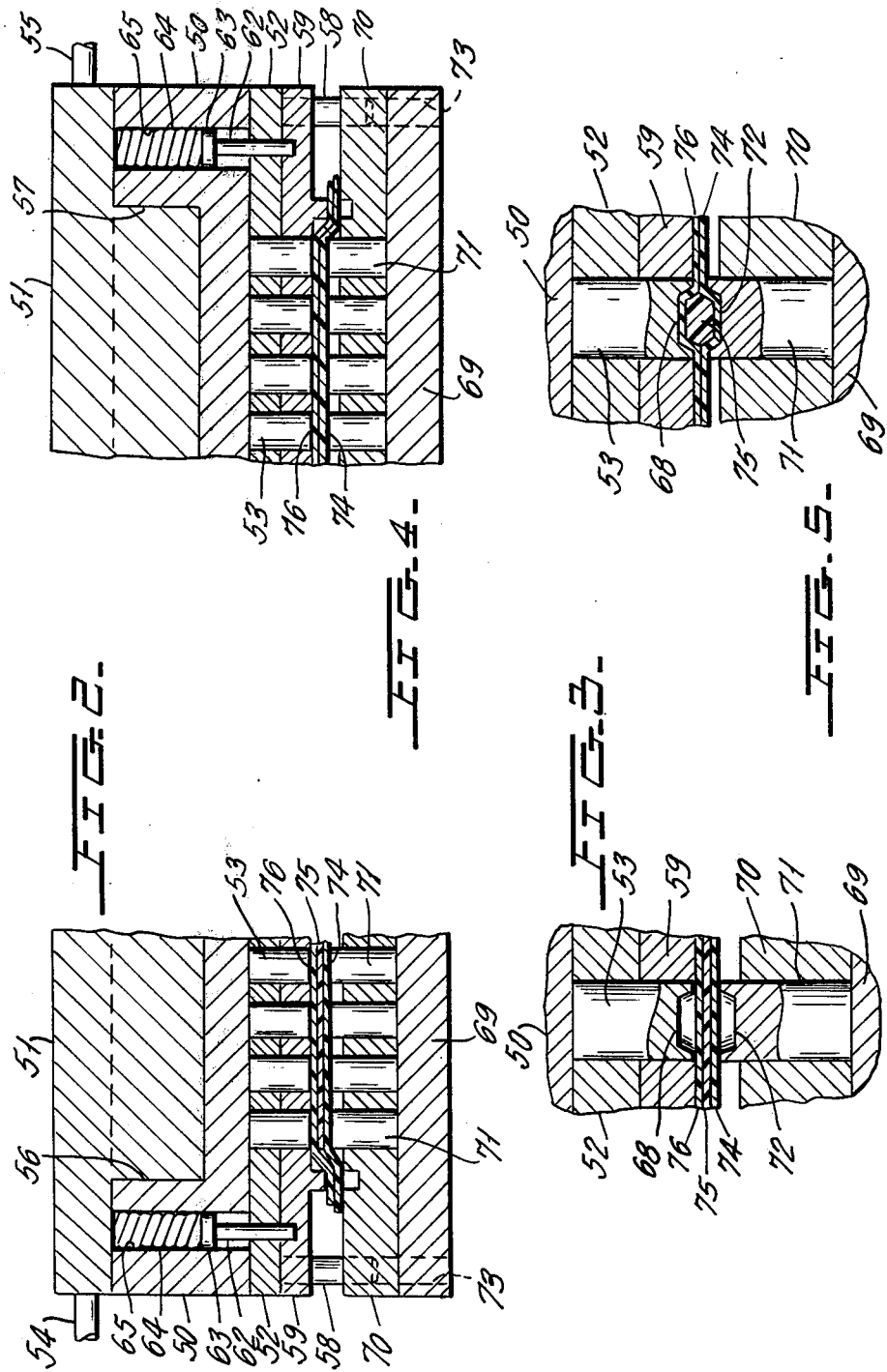

COMPRESSION MOLDING PROCEDURE FOR LIQUID POLYESTER RESINS

This invention relates to a compression molding procedure for liquid thermosetting polyester resins, and particularly for such resins wherein the resin is mixed with pearlescent particles for enhancing the luster of the resulting compression molded item. The invention has particular value in connection with the manufacture of pearlescent buttons, though it is not limited to this use.

BACKGROUND OF THE INVENTION

Various techniques are known for molding articles of different kinds of heat-hardenable, substantially liquid resins, particularly addition type polyester resins of the thermosetting character. See, for example, U.S. Pat. No. 3,216,060, incorporated herein by reference, and U.S. Pat. Nos. 2,962,764 and 2,962,767. The invention is an improvement over the methods described in the foregoing patents.

Throughout this specification and in the claims, the terms "upper" and "lower" are used in reference to mold parts of a compression mold by which the processes of the prior art and of the invention are performed. Generally, molds are comprised of one mold part which is atop another mold part. However, in certain environments, the mold parts might be side by side. In that case the upper mold part described herein is one of the two mold parts and the lower mold part described herein is the other mold part.

In conventional compression molding, the resinous composition is placed between the mold parts when they are in a fully open position. The mold parts are then moved together from a fully open to a fully closed, compressed condition during a period of approximately five to eight seconds. The now closed mold with the compressed resinous composition therein is heated so as to completely polymerize the resinous composition.

In the molding of liquid addition type resins, it is known to fill the cavities in at least one of the upper and lower parts of a mold with measured amounts of resin and to then place a sheet of an appropriate covering material, such as a material comprised of polyvinyl alcohol, over the liquid resin on the mold parts and then to bring the mold parts together to heat-set the material. In particular, in the disclosure of U.S. Pat. No. 3,216,060, the liquid resin is captured between two layers or sheets of the covering sheet material. Each layer is contacted by the respective one of the upper and lower mold parts when they are brought together. The sheets capture the resin material and prevent it from escaping from the mold, enable release of the heat-set resin from the mold after compression molding, and do not interfere with the compression molding.

Pearlescent material is frequently added to the thermosetting resins which are compression molded in order to give the resulting molded product a pearlescent, semi-glossy appearance. Various pearlescent materials are known, including fish scales. The pearlescent material is frequently in the form of flakes that are mixed with the liquid resin.

It has been found that pearlescent particulate materials initially uniformly mixed with a liquid thermosetting resin generally migrate to the outer surface of the mold part, to be nearer where the mold parts come into contact. Because of this, in button manufacture, this has led to the molds only being sub-cavity molds with a flat face side on one mold part facing a sub-cavity in the other mold part in order that satisfactory pearlescent appearance of the surface layer, often called the pearl orientation, may be obtained on the outwardly facing side of the button.

In compression molding using liquid thermosetting resins incorporating pearlescent materials, a number of goals are sought to be achieved. When a button or the like item is compression molded, it is desirable to have uniform pearlescence across the outwardly facing surface. This is more easily achieved when a button is formed with a flat front surface. However, as is frequently done with buttons, after removal of the molded piece from the mold and after separation of the molded piece from the layers of polyvinyl alcohol sheet material or the like sheet material, where such separating layers are used, the face or front side of the molded item is depressed, usually by grinding or cutting after manufacture. Uniform distribution of pearlescence across the fronts of the buttons, or the like molded pieces, even after they have been ground or cut, is desired.

The known technique of compression molding pearlescent button blanks has a number of drawbacks which manufacturers in this field have come to tolerate. The depth orientation of the pearlescence on the top side of the molded piece is a relatively small fraction of the total thickness of the piece, usually not exceeding about $12\frac{1}{2}\%$ of the thickness dimension. This means that although the pearlescent material is distributed throughout the thickness of the compression molded blank, there is a concentrated layer of pearlescent material which is relatively thin at the top of the molded piece. During the post-molding fabrication steps, such as machining, grinding or otherwise forming depressions in the molded piece or beveling its edges, the layer of more concentrated pearlescent material may be removed. The thinness of the surface layer, often called the orientation of pearlescent material, places substantial limits on the cutting or shaping of the molded piece as the orientation and pearlescent luster disappears completely when a cut is deeper than about $12\frac{1}{2}$ percent of the thickness of the piece. As a result, in conventionally molded pearlescent buttons that have been cut or milled, the cut or milled area of the button does not have the same luster as the uncut or not so deeply cut portions of the blank.

In addition, there is a tendency for some of the pearlescent material around the perphery of the cut blank to disappear, which creates undesirable translucent aread around the periphery. Were the pearlescent orientation deeper, this would not occur.

Furthermore, a compression mold for making a large number of buttons, or the like relatively small pieces, comprises a large number of cavities in which products are to be molded. Typically, although what has been calculated to be the correct amount of resinous composition has been applied between the mold parts, not all of the cavities in the mold parts are completely filled when the mold parts are compressed together, whereby many of the molded pieces must be discarded as incompletely formed and of poor quality. It is known already to charge the molds with excess resinous composition so as to properly fill more of the cavities. Yet, even with overcharging the mold with 35–45 percent more by weight of the resinous composition required to fill the cavities, still a large proportion of the available cavities are not completely filled, and many unusable pieces are therefore molded. The amount of overcharging required is dependent upon the size of the individual pieces being compression molded, with greater overcharging being required for larger size molded pieces.

Another aspect of the above described problem is that when buttons with shanks, or the like molded pieces with shanks, are conventionally compression molded, the shanks of many of the items do not fill out and are somewhat truncated. Especially when the button is attached to a garment at a hole through the shank of the button, the truncation prevents fabrication of usable buttons.

Further still, conventionally compression molded buttons have front surfaces that are slightly concavely depressed, which causes problems in fabrication or shaping, e.g. cutting of the button during shaping of the button.

Also, when relatively large molded pieces, larger than about 1½″ diameter, such as buckles or slides, are conventionally compression molded, they frequently warp.

The button blank or the like piece, which is conventionally compression molded, has a satisfactory pearlescent appearance on the top, which is preferably the front side of the button or piece. But, the rear or underside thereof has an unsatisfactory, substantially reduced pearlescence.

With conventional molding procecures, in order that the pearlescence may appear on the top or front surface of the molded piece, the molding procedure has been confined to sub-cavity molds, i.e., molds wherein the cavities are one of the two mold parts and, more conveniently, the upper mold part. It has been found that where button blanks are molded in compression molds with cooperating top and bottom mold cavities, a satisfactory degree of pearl orientation is not achieved in either the top or the bottom molds.

SUMMARY OF THE INVENTION

In the present state of the art of compression molding of liquid polyester resins in which pearlescent particulate materials of various kinds have been mixed, it has been found that increasing the viscosity of the resin beyond its viscosity at the time that the resin is received between the mold parts is desirable. This improves the pearlescence of the molded pieces and the molding procedure, as detailed further below.

It is the primary object of the present invention to improve the pearlescent orientation of compression molded pieces.

It is another object of the present invention to increase the thickness of the pearlescent lustrous layer or orientation of a compression molded piece comprised of a thermosetting resin in which pearlescent particulate material is mixed.

It is another object of the present invention to improve the yield of usable pieces produced in a compression molding process.

It is yet another object of the invention to reduce the extent to which a compression mold need be overcharged in order to maximize the production of usable molded pieces from a single molding procedure.

Further objects of the invention are to reduce the incidence of truncation of the shanks of molded pieces having shanks, to reduce or eliminate depressions in the front surface of a molded piece and to eliminate warping of molded pieces, particularly large diameter pieces.

Still another object of the invention is to be able to produce pearlescent molded pieces comprised of a thermosetting resin wherein the mold has both top and bottom cavities and wherein molding is not limited to sub-cavity molds.

It is a further object of the invention to increase the viscosity of the thermosetting resin in which pearlescent particulate material is mixed and from which pieces are to be compression molded, before the thermosetting resin is compression molded and polymerized, as this has been found to improve the pearlescent orientation of the resulting molded pieces.

The inventor hereof has found that at least some of the foregoing and other objects may be realized through a critical change in the molding procedure. After the liquid form thermosetting resin mixed with pearlescent particulate material has been placed on the lower mold part, for example, by placing a layer of thermosetting resin which is between two sheets or layers comprised of polyvinyl alcohol, or the like, on the lower mold platen, thereafter instead of simply moving the upper and lower mold parts together to the fully closed position and immediately compression molding the resin under heat, the upper and lower mold parts are first moved together to a semi-closed position. At this position, the resin is resting on the lower mold part and the upper mold part has been moved toward the lower mold part enough to just initially contact the resin, without applying pressure to it. In the preferred embodiment of the invention, wherein the resin is between two sheets of supporting material, the upper mold part and lower mold part are moved together so that the upper mold part is just touching the top sheet of the supporting material. The mold parts are held in the semi-closed condition for a period of time in excess of the period normally required for the mold parts to move from their fully open to their fully closed positions. While the mold parts are held in their semi-closed position, the temperature of at least one of the mold parts is held at an elevated level. Typically, as noted above, mold parts require from 5–8 seconds to travel from the fully open to the fully closed, compressed conditions. The mold parts are, according to the invention, held in the semi-closed condition described above for a period in the range of from 10–50 seconds, and preferably for a period of about 25 seconds, and are held at an elevated temperature in the rang of from 180°–260° F., and preferably at about 200° F. Following the holding of the mold parts in the semi-closed condition, the mold parts are operated to the fully closed condition and compression molding thereafter continues, as more fully described in aforesaid U.S. Pat. No. 3,216,060.

Although the best results have been achieved with the preferred time and temperature of the preheating stage, as described above, substantially equally good results can be obtained so long as the time and temperatures of the preheating stages are in the ranges set forth above.

With a mixture in the same ratio of thermosetting resin to pearlescent particulate material as may be used in practicing the process described in U.S. Pat. No. 3,216,060, but using the process as described hereinabove, the inventor has observed the following results. While the mold parts are being held in their semi-closed condition, the viscosity of the pearlescent material increases considerably. It is this increase in the viscosity which, the inventor believes, is the cause of the results achieved, as described. First, a greatly improved pearlescent appearance and luster are obtained on the molded pieces, as contrasted with molded pieces fabricated according to the process in the aforesaid patents. The layer of the molded piece in which the pearlescent material is highly concentrated and which is lustrous, i.e. the pearlescent orientation, is substantially deeper than in the prior art, ranging from 30-50 percent of the depth of the molded piece, depending upon the total thickness of the piece. This is to be contrasted with the observed approximate 12½ percent depth of the pearlescent orientation previously experienced. The amount of thermosetting resin which must be placed between the upper and lower mold parts in excess of the quanity actually needed for filling the mold cavities is reduced, by a factor of 40-50 percent. In addition, a greater number of the cavities in a multi-cavity compression mold are completely filled, producing a greater proportion of usable molded pieces, as contrasted with the prior art. Despite the time expended during the pre-heating stage with the mold parts in their semi-closed condition, the speed of an over-all molding cycle is increased by about 25 percent, as contrasted with the prior art procedure. Furthermore, pearlescence is more uniformly distributed across all of the pieces formed in the mold, as contrasted with the prior molding procedure. Quite important also, it is not necessary to limit the molding to sub-cavity molds, but now both the upper and lower mold parts may include mold cavities. This process makes it possible to mold a button blank to a desired shape, i.e., with undercuts and depressions, while still producing a satisfactory pearlescent appearance over the entire button blank, thereby eliminating the need for fabricating and other finishing operations after the molding is completed.

With respect to the viscosity changes noted by the inventor hereof during the known process of molding and during the process according to the invention, the inventor has discovered that from the time the preheated polyester thermosetting liquid resin, in its cooked state and mixed with the pearlescent particulate material, is applied to the lower mold part and during that period of from 5-8 seconds when the mold parts move together, the viscosity of the resin drops by about as much as 60 percent. Once the mold parts are brought to their fully closed condition and are compressed, and the heat of the mold parts cooperates with the pressure they apply, the viscosity of the resin in the mold starts to rise again. During the compression molding, the resin eventually polymerizes and thereafter further changes in the viscosity of the resin do not occur. In the prior art, while the blanks are under compression, even though the viscosity of the resin is rising, it does not again attain the level of viscosity that it had when it had been first deposited on the lower mold part. According to the present invention, on the other hand, when the mold parts are held in the semi-closed condition for the time stated above and at the temperatures stated above, without polymerizing, the viscosity of the resin increases to a level greater than its viscosity before the thermosetting polyester resin was applied to the lower mold part. The compression molding of the higher viscosity resin material mixed with particulate pearlescent material provides a deeper pearlescent orientation and provides the other benefits of the invention.

Example: Prior Art

In one example, a liquid, thermosetting, polyester resin is comprised of 135 lbs. of Selectron RS 50096 (rigid) polyester resin and 13.5 lbs. of Selectron RS 5273 (flexible) polyester resin, proprietary resins of PPG, Pittsburgh, PA; 4.5 lbs. of Mearl ZPG, a proprietary pearl pigment supplied by Mearl Corporation, Ossining, New York; and 2 lbs. Luperco ATC, a proprietary catalyst, comprised of 50—50 mixture of benzoyl peroxide and tricresyl phosphate.

The above-noted resin composition is precooked to increase its viscosity to at least 20,000 Centipoise (CPS), but preferably to 50,000 CPS.

It is then placed between two sheets of polyvinyl alcohol. The sandwich with the resin in the middle is then placed on the lower one of two mold parts. At that time the heated resin material has a viscosity of 50,000 cps. During the 5-8 seconds required for the mold parts to move from the fully open to the fully closed, compressed condition of the prior art, the viscosity of the resin decreases to 20,000 cps. While the resin is compressed in the mold under heat, it is polymerizing. Before it polymerizes and while it is under compression and is being compressed into the mold cavities, the viscosity of the resin increases to 30,000-40,000 cps, which is lower than the viscosity of the resin when it was first applied to the lower mold part. The molded blanks produced according to the prior art have the drawbacks noted above.

Example: Process According to the Invention

In the procedure according to the present invention, the resin and pearlescent materials are the same and are in the same ratios as in the example according to the prior art. The resin when applied to the lower mold part has a viscosity of 50,000 cps. As in the prior art, during the approximately 5-8 second period during which the mold parts move from the open condition to their semi-closed condition, the viscosity of the resin declines to 20,000 cps. With the mold parts held in the semi-closed condition described above for a 25-second period at a temperature of 240° F., the viscosity of the resin rises to 80,000 cps, and the resin does not polymerize. This viscosity is a higher level than the viscosity of the resin when it was first applied to the lower mold part while the mold parts were in their open condition. Now the mold parts are moved to their fully closed, compressed condition at which the resin is compressed into the mold cavities. The viscosity of the resin continues to rise to a range of 90,000-100,000 cps. Finally, the resin polymerizes and its viscosity thereafter does not change. The resin becomes heat set.

It is apparent that with the process according to the invention, the viscosity of the resinous composition which includes pearlescent material, rises to a level that is about three times the level of the viscosity of the same resin that is molded according to the process of the prior art. It is believed by the inventor that the increase in viscosity results in the various benefits described above. With the realization of the benefits described above, a much lower cost process results which yields a far superior, more versatile molded piece and using the same materials as were used in practicing the prior art.

BRIEF DESCRIPTION OF THE DRAWINGS

The process of the invention may be understood from the foregoing description. The drawing Figures accompanying this disclosure show one embodiment of molding apparatus used in the performance of the process according to the invention.

FIG. 2 is a fragmentary view illustrating the same mold parts after they have been moved to the semi-closed condition.

FIG. 3 is an enlarged view of two molding dies of the mold parts of FIG. 2 acting on the resin layer between them.

FIG. 4 is a fragmentary view illustrating the same mold parts after they have been moved to the fully closed condition.

FIG. 5 is an enlarged view of two molding dies of the mold parts of FIG. 4 acting on the resin layer between them.

Figure 1:
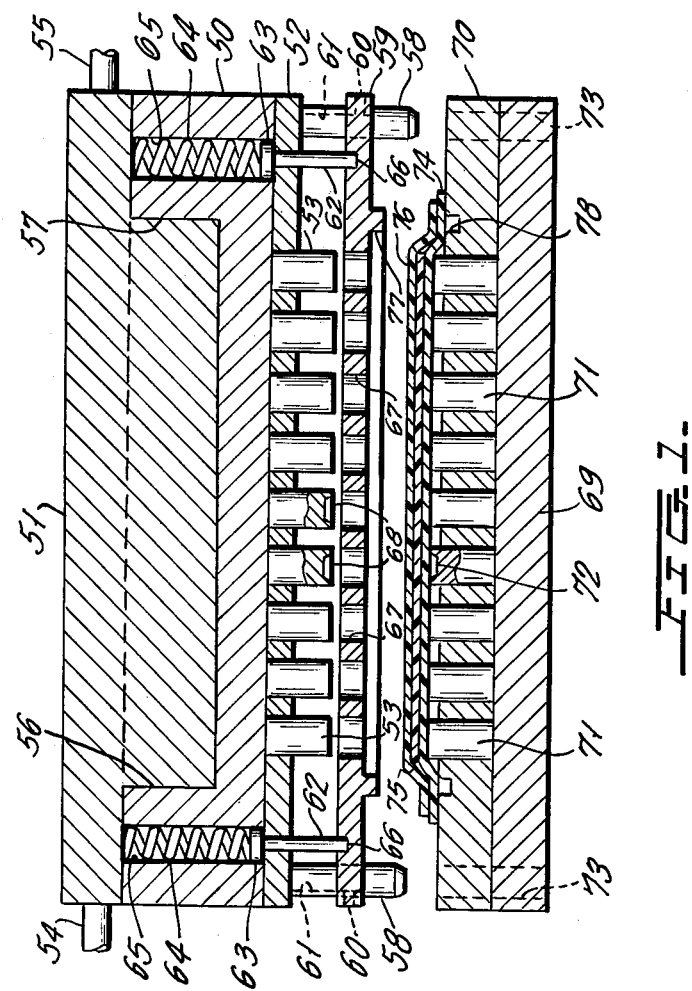
FIG. 1 is a central, vertical, cross-sectional view through a mold comprised of upper and lower parts, with a pearlescent material containing thermosetting polyester resin between the mold parts and wherein the mold parts are in the fully open condition.

DETAILED DESCRIPTION OF AN EMBODIMENT OF APPARATUS FOR PRACTICING THE PROCESS OF THE INVENTION

The apparatus shown in the accompanying drawing is substantially the same apparatus shown and described in U.S. Pat. No. 3,216,060, which is incorporated herein by reference. In the apparatus, the top part of the mold includes a spring housing plate 50, which is disposed between and is secured to a heating plate 51 above it and a retainer plate 52 below it which receives the molding dies or "cavities" 53. These molding dies are shown by way of example as being provided with recesses or cavities shaped for the molding of shirt buttons. It is understood, of course, that the molded pieces or blanks to be produced by the molding apparatus shown may be any blank capable of being compression molded.

The heating plate 51 is hollow and is charged in a known manner with a suitable heating fluid which passes between inlet 54 and outlet 55. Alternatively, electrical heating elements (not shown) may be disposed within the heating plate 51. The source of heat is brought close to the retainer plate 52 and the mold cavities 53.

Adjacent to corners of the plate 52 or at its periphery are a plurality of depending guide pins 58. A floater plate 59 is positioned beneath the retainer plate 52 and is suitably apertured to receive the guide pins 58 and is also free to slide along such guide pins. Downward motion of the floater plate 59 may be limited by pins 58, which are shaped for this purpose.

Spaced adjacent to the periphery of the floater plate 59 are a plurality of rods 62 which terminate in circular bearing plate 63 for springs 64 which are received within the chambers 65 in the spring housing plate 50. The lower ends of the rods 62 are received within respective recesses 66 in the floater plate 59.

A relatively large number of dies or cavities are secured within the retainer plate 52. The floater plate 59 is provided with a corresponding number of bores or holes 67, each of which registers with a respective cavity 53 and is adapted to receive the cavity 53 with a snug fit.

The floater plate 59 is guided in its vertical movement along the guide pins 58 and can rise to receive the dies 53 within the apertures 67, against the resistance of the springs 64. When the floater plate 59 is pressed up against the retainer plate 52 with the mold parts in the fully closed condition, the floater plate 59 rises to receive the dies 53 within the apertures 67. The dies 53 are of a length to then project beyond the bottom surface of the plate 52. The floater plate is of no greater thickness, and is prefeably somewhat less thick, than the height of the projecting portion of the dies 53, so that when the plate 59 bears directly against the plate 52, the lands or shaping portions 68 of the dies 53 are exposed.

The lower mold part is comprised of a heating plate 69 which may be heated in the same manner as the upper mold part. The lower mold part is secured to a retainer plate 70 which carries dies or cavities 71 having respective projecting lands or shaping parts 72. The dies 71 have cavities that are complementary and that register with the cavities of the dies 53. Passiing through the plates 69 and 70 at the corners thereof are holes 73 which snugly receive the above described guide pins 58 of the upper mold part as the mold parts are moved together, by either raising the lower mold part, lowering the upper mold part, or moving both of them together.

The molding operation is performed as follows. The deaerated, liquid, addition type resinous composition 76 containing a suitable amount of catalyst and the pearlescent material is placed between two stretchable sheets or films 74,75 comprised of polyvinyl alcohol material. Of course, in a subcavity mold, only one stretchable sheet is needed for entering the subcavities. A non-stretchable sheet could be used on the other mold part without the cavities. However, a mold with cavities in both of the upper and lower mold parts is illustrated. Enough resinous composition is used to fill all the mold cavities, plus sufficient excess, as required for assuring all mold cavities will be filled. The liquid resinous composition is spread generally uniformly between the two films so that the resin will reach to the outermost row of cavities.

Turning to FIGS. 2 and 3, the mold, both the upper and lower mold parts of which have been preheated, is now rapidly moved to the semi-closed condition illustrated by moving the mold parts relative to one another. In the semi-closed condition, the floater plate 59 is brought into engagement with the top sheet 75 over the resinous composition, without applying pressure to that composition. The pressure that is applied is sufficient however, to press the plate 59 up toward and against the retainer plate 52, so that the cavities 53 pass through the receiving apertures 67 therefor and it is the cavities 53 that contact the top sheet 75. The cavities are at the elevated temperature noted above, e.g., 240° F., and are held at this elevated temperature while the mold parts are held in the semi-closed condition illustrated in FIG. 2 for a predetermined period, e.g., 25 seconds.

Turning to FIGS. 4 and 5, at the conclusion of the 25-second period, the heated mold parts are shifted to their fully closed condition. The resinous composition is squeezed between the lower part of the mold and the floater plate 59, and is forced into the apertures 67 by the mold cavities 53,72, until, eventually, very little of the resinous composition is left in the areas between the adjacent apertures 67. At the same time, the top dies or cavities 53 enter the floater plate holes 67 from the top. The top cavities 53 engage the top film 75 and start to press the liquid resinous composition with the overlying films 74,75 to the shape of the top cavities and into the lower cavities. The lower film 74 is at the same time stretched and forced against the walls of the lower cavities. As there is a slight excess of resinous composition in each hole 67 in the floater plate, as the mold parts approach the completely closed condition at which the plates 52 and 59 are in contact, the lands of the top and bottom cavities pinch off separate areas of the distended films 74,75. Any excess resinous composition is forced out to form flash between the floater plate and the bottom half of the mold about such pinched off areas. The molded pieces have now been completely formed.

Pressure is applied under heat at least until the resinous composition polymerizes. The mold is reopened after the resinous composition has cured or gelled past the point of bubble formation in the polymerized resin. The movement of the floater plate 59 relative to the dies 53, under the action of the springs 64 as the mold opens, strips the upper film off the dies 53 and the entire batch of molded pieces may be removed from the mold as a unit when the mold has been opened.

Other aspects of a molding technique are shown and described in U.S. Pat. No. 3,216,060 and are not repeated here.

In summary, an effective molding process for increasing and improving a pearlescent layer on a compression molded blank has been described.

Although the present invention has been described in connection with a preferred embodiment thereof, many variations and modifications will now become apparent to those skilled in the art. It is preferred, therefore, that the present invention be limited not by the specific disclosure herein, but only by the appended claims.

I claim:

1. A process for heat and pressure molding of a thermosetting resinous composition, wherein the mold comprises upper and lower mold parts which are relatively movable between an open condition, a partially closed condition and a fully closed condition, wherein at least one of the mold parts includes mold cavities into which the resinous compositions may be compressed, the process comprising the steps of:

applying a heat-hardenable, substantially liquid, polymerizable, resinous composition between the mold parts while they are in the open condition;

moving the mold parts to a semi-closed condition so that the upper mold part is contacting the resinous composition, without applying molding pressure thereto;

holding the mold parts at the semi-closed condition for a period of time sufficient to apply heat to and to heat the resinous composition by applying heat at at least one of the mold parts; applying heat to at least one mold part at an elevated temperature so that the heat is applied to the resinous composition for the period of time;

thereafter moving the mold parts to the closed condition, at which elevated pressure is applied to the resinous composition for forcing the resinous composition into the mold cavities, while maintaining the mold parts at elevated temperatures.

2. The molding process of claim 1, wherein the resinous composition comprises a resin mixed with pearlescent particulate material.

3. The molding process of claim 1, wherein prior to moving the mold parts to the semi-closed condition, the resinous composition is placed between two layers of a film material, in which the resinous composition is thereafter contained while the mold parts are moved to and held at the semi-closed and the closed conditions, at least one of the layers of film material is stretchable.

4. The molding process of claim 1, wherein the period of time the mold parts are held at the semi-closed condition is in the range of 10–50 seconds.

5. The molding process of claim 1, wherein the temperature of the mold parts, while they are in the semi-closed condition, is in the range of 180°–260° F.

6. The molding process of either of claims 1 or 2, comprising the additional step of curing the resinous composition.

7. The molding process of claim 6, comprising the further step of removing the molded blanks from the mold cavities.

8. The molding process of either of claims 1 or 2, wherein the resinous composition as applied to the lower mold part has a first viscosity; the mold parts being held at the semi-closed condition thereof until the viscosity of the resinous composition exceeds the first viscosity, and the mold parts being thereafter moved to the closed condition.

9. The molding process of claim 8, wherein prior to moving the mold parts to the semi-closed condition, the resinous composition is placed between two layers of a plastic material, in which the resinous composition is thereafter contained while the mold parts are moved to and held at the semi-closed and the closed conditions; at least one of the layers of film material is stretchable.

10. The molding process of claim 8, wherein the period of time the mold parts are held at the semi-closed condition is in the range of 10–50 seconds.

11. The molding process of claim 10, wherein that period of time is approximately 25 seconds.

12. The molding process of claim 10, wherein the temperature of the mold parts, while they are in the semi-closed condition, is in the range of 180°–260° F.

13. The molding process of claim 12, wherein the temperature is approximately 240° F.

14. The molding process of claim 10, wherein the time of the motion of the mold parts from the open to the semi-closed conditions is in the range of about 5–8 seconds.

* * * * *